Jan. 4, 1966    M. J. CELOVSKY    3,227,008
BROACH AND METHOD OF REPAIRING THE SAME
Filed July 12, 1961    2 Sheets-Sheet 1
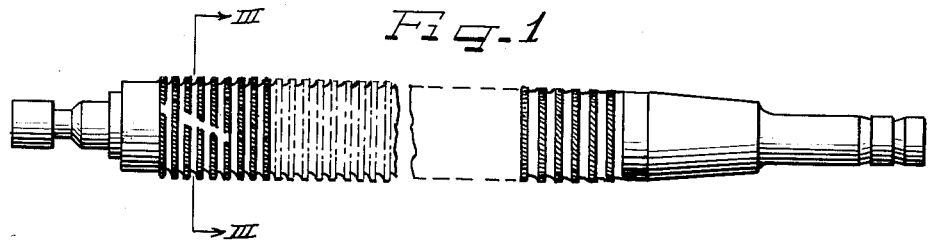
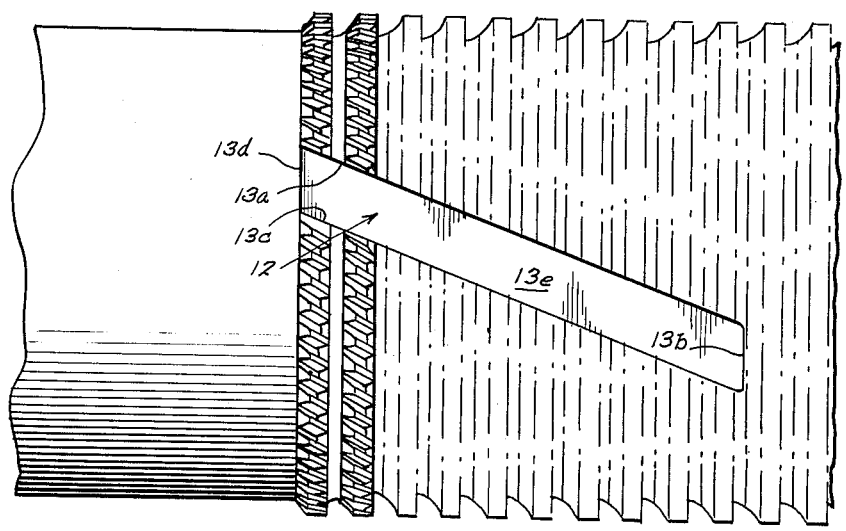
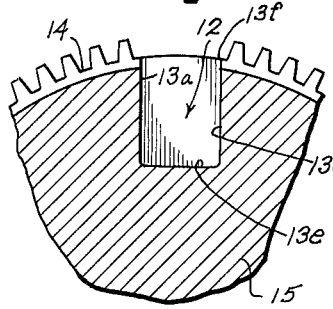 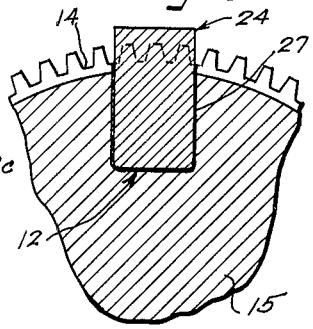 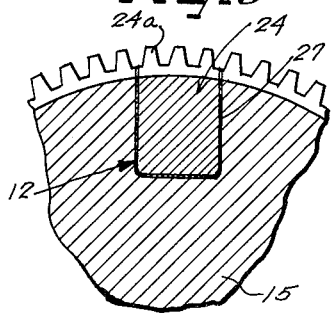
INVENTOR.
Michael J. Celovsky
BY
ATTORNEYS Jan. 4, 1966 M. J. CELOVSKY 3,227,008
BROACH AND METHOD OF REPAIRING THE SAME
Filed July 12, 1961 2 Sheets-Sheet 2
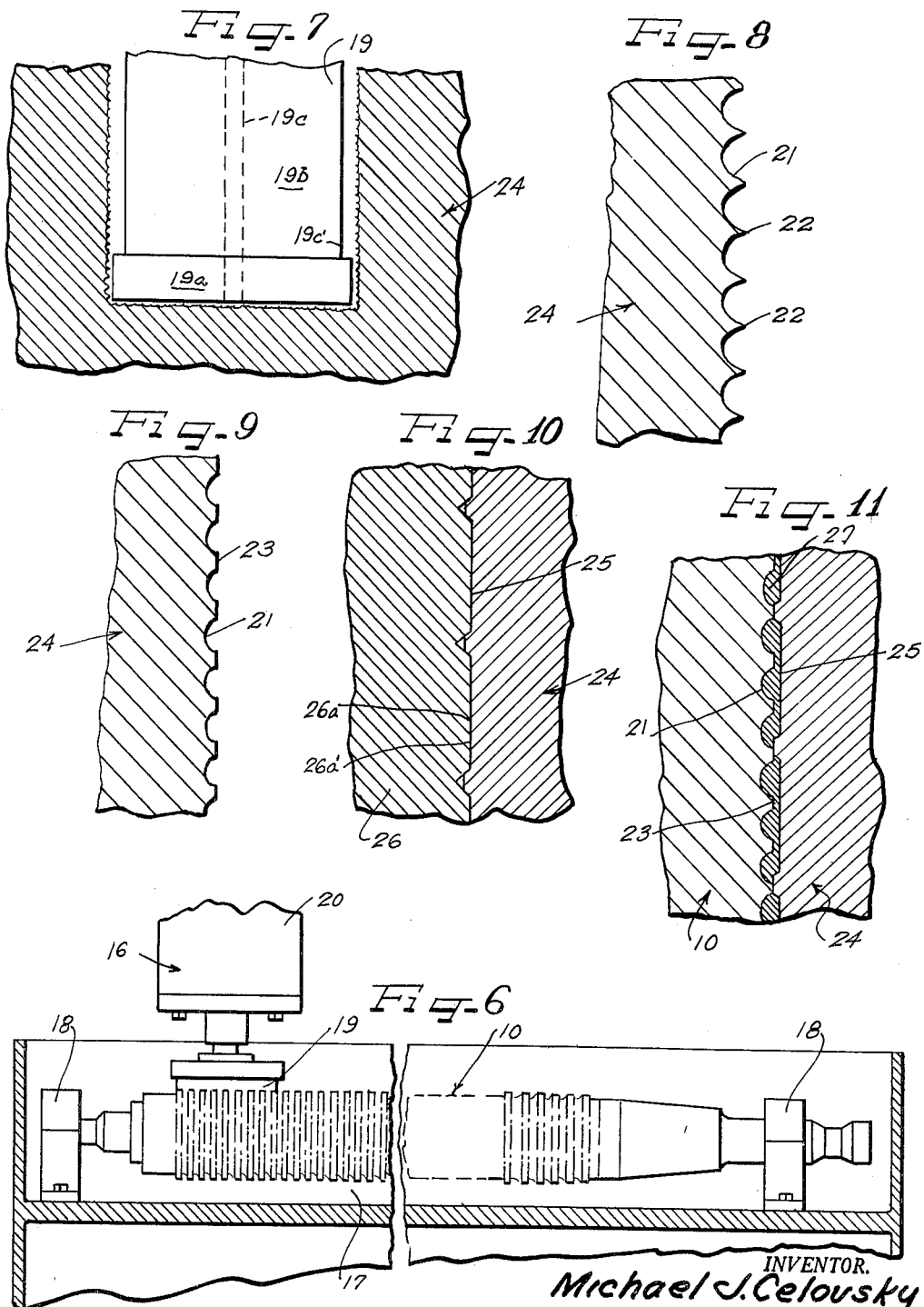
INVENTOR.
Michael J. Celovsky
BY
ATTORNEYS

United States Patent Office 3,227,008
Patented Jan. 4, 1966

3,227,008
BROACH AND METHOD OF REPAIRING
THE SAME
Michael J. Celovsky, 1401 Abington Road,
Detroit 27, Mich.
Filed July 12, 1961, Ser. No. 123,521
12 Claims. (Cl. 76—101)

The present invention relates generally to a new and improved method of securing an insert with a metal article. More particularly, the present invention relates to a new and improved method of replacing damaged teeth on a broach.

In the past, it has been virtually impossible to economically and satisfactorily replace damaged teeth on a broach. Frequently, the broach teeth will be damaged at an early stage of the life expectancy of the broach and it has been generally necessary to then scrap the broach thus occasioning the loss of thousands of dollars per unit, depending on the size and the type of article or broach. In the past, attempts have been made to replace damaged teeth on a broach by welding new teeth to the broach. These prior attempts have been generally unsuccessful and unsatisfactory for the replaced teeth generally work loose because the weld is inadequate to positively fix the teeth to the broach when the teeth are subjected to load. Where the replaced teeth have been welded to the broach, the surrounding undamaged teeth have been frequently damaged because of the high temperature to which they are subjected during the welding operation of the new teeth to the broach.

According to the present invention, the damaged teeth may be replaced by electrical discharge machining of a hole in the broach or cutter or article at the area of the damaged teeth to remove the damaged teeth therefrom. The electrical discharge machining is carried out in such a way that the hole in the broach is defined by pitted side walls. These pitted side walls are then ground to remove rough edges about the pits, but leaving the pits in the side walls. An insert is then manufactured having side walls provided with pits and this insert is sized to enable it to be slip fitted within the hole. Solder of a suitable type is placed within the hole, and the insert is then also inserted into the hole. The insert is then placed under load and the article or the broach is heated to a temperature sufficient enough to cause the solder to flow into the pits to secure the side wall against movement, and in assembly with the side wall in the hole upon cooling of the solder.

In accordance with the present invention, it has been found that by the practice of the method disclosed herein, the foregoing difficulties may be eliminated. In other words, the teeth may be secured to the broach in such a way that they will not slip with respect to the broach when placed under load. It has further been found that where the new teeth are locked with the broach by means of solder that the surrounding teeth are not damaged since they need not be subjected to the high heat temperatures required for a welding operation because of the relatively low melting point of solder.

Tests have shown that where the insert has been soldered to the broach in accordance with the present method, and where the insert has been repeatedly struck with a five pound sledge hammer that the insert remains in a fixed position on the broach. These tests have further shown that the bond between the insert and the broach remains intact so that the insert does not wobble or move in the hole in the broach, thus overcoming one of the main problems in the repair of cutters or broaches.

An important object of the present invention is to provide a new and improved method for repairing metal tools or cutters, such as broaches and the like.

Still another important object of the present invention is to provide a new and improved method for securing an insert to a metal article so that the insert will not wobble or move with respect to the article when subjected to loads applied against it.

A still further object of this invention is to provide a new and improved repaired broach.

Yet another object of this invention is to provide a new and improved method for cutting a hole in a metal article so that the hole will be defined by parallel or vertical walls.

A further object is to provide an improved electrode for cutting deep holes in tool steel.

Other objects and features of this invention will more fully become apparent in view of the following detailed description taken in conjunction with the accompanying drawings in which:

FIGURE 1 is a fragmentary plan view of a helical or spiral type broach;

FIGURE 2 is an enlarged fragmentary top plan view of the broach of FIGURE 1 having a hole cut in it at the area of the damaged teeth;

FIGURE 3 is an enlarged radial cross sectional view taken substantially on the lines III—III in FIGURE 1 looking in the direction indicated by the arrows;

FIGURE 4 is an enlarged fragmentary radial sectional view similar to FIGURE 3 only showing the broach having an insert mounted within the hole;

FIGURE 5 is an enlarged fragmentary radial sectional view similar to FIGURES 3 and 4 only showing the insert having teeth cut therein;

FIGURE 6 is a fragmentary side view partially in section illustrating the manner in which the hole is burned into the broach;

FIGURE 7 is an enlarged fragmentary cross sectional view of the broach hole with an EDM electrode mounted therein;

FIGURES 8 and 9 are enlarged fragmentary cross sectional views as showing how the walls of the broach hole before and after they are ground;

FIGURE 10 is an enlarged vertical section illustrating how pits are formed in the insert; and FIGURE 11 is a vertical section through the insert and the broach showing how the solder secures them in assembly together.

As shown on the drawings:

The reference numeral 10 in FIGURE 1 indicates generally a helical type broach having helically arranged teeth 11 formed thereon. Due to the fact that some of the teeth have been damaged, the broach 10 is illustrated as having a hole 12 defined by side walls 13a, 13b, 13c, 13d, and a bottom wall 13e. This hole has been cut at the area where the damaged teeth were formerly located. The hole is cut in such a way that upper edges 13f of the side walls are joined with lands 14 disposed between the teeth (FIGURE 3). In other words, the hole does not cut across or bisect any of the teeth, but rather extends through the lands 14 defined between the teeth. The reason for this is that it is easier to grind new teeth to shape in their entirety rather than forming only part of a tooth. Furthermore, the strength of each tooth is greater when it is formed from solid stock.

In order to form the hole 12, and EDM process is utilized to cut away the damaged teeth as well as a portion of the center stock 15 of the broach. The EDM process is well known in the art, and FIGURE 6 illustrates diagrammatically such an apparatus, as indicated at 16.

The apparatus 16 includes a tub 17 having electrolyte therein. Support blocks 18—18 are disposed at opposite ends of the tub 17 for supporting the broach 10 within the tub, and the electrolyte covers the area where the damaged teeth are to be removed. An electrode 19 is mounted on a vertically movable arm 20 and is of a size which corresponds to the size of the hole that is to be cut in the broach 10.

The EDM process may be carried out in any suitable manner such as is disclosed in the U.S. Patent No. 2,526,423.

The electrode 19 illustrated in FIGURE 6 is also illustrated in FIGURE 7, in greater detail. The electrode 19 embodies certain features of the present invention, and in this respect, it will be noted that the electrode 19 has an enlarged discharge head 19a as well as a shank portion 19b which is of a smaller peripheral dimension than the cutting head. It has further been found that a graphite type electrode will satisfactorily burn the hole in the broach which is made from high grade steel. In order to cut a relatively deep hole it has been found that the electrode must be relieved one quarter of an inch or less from its bottom surface to attain this end.

As the hole is being burned, fluid is caused to flow through the passageway 19c whereby the particles being removed or burned are caused to flow upwardly out of the hole. It has been found that where the shank 19b is undercut, as shown at 19c' that the particles being removed may flow more readily away from the cutting area to avoid overburn where the particles of the work piece do burning. By using an electrode of the type shown in FIGURE 7 which eliminates overburn of the side walls, it is no longer necessary to cut down the tapered side walls of a hole formed by a conventional type of electrode which is not undercut. Another important advantage of using an electrode of this type is that a relatively deep hole may be cut which hole has straight parallel side walls rather than tapered side walls.

During the burning process, myriads of pits 21 are formed in the side wall of the hole. The depth of the pits may be varied in accordance with the rate of electrical discharge being utilized to effect burning. Where a relatively rough burn is used, such as where a relatively deep hole is to be cut into a metallic object, the finish of the side walls is characterized as including sharp edges, as indicated at 22 in FIGURE 8. After the edges 22 are formed, it has been found to be desirable to grind the edges 22 manually with a stone to render them flat as indicated at 23 in FIGURE 9, so that a slip fit may be obtained with an insert 24 to be installed within the hole 12.

The insert 24 is sized so as to be capable of snugly fitting with the side walls defining the hole 12. The insert 24 also possesses an EDM finish characterized by its irregularity and as having pits 25 therein. An electrode 26 shown in FIGURE 10 is for burning the pits 25 in the insert 24. The electrode 26 may be made from a suitable material such as brass and the like. The electrode 26 possess a "waffle face" surface 26a for burning pits 25 in the insert. The surface 26a has raised portions 26a' on it for burning the pits 25 in the insert 24.

A suitable solder 27 such as Eutic Tin-Weld is then placed in the hole 12, and this material may have a low melting temperature such as 370° as compared to a welding temperature of 1200°.

After the insert has been installed in the hole, it is desirable to place a clamp (not shown) about the broach and about the insert so that the insert will be subjected to a spring load so the solder on the bottom of the hole will be forced upwardly along the sides of the insert 24 and into the pits and into the slip fit space between the insert and the broach hole walls. The spring functions to force out all excess solder so that the only solder that remains in the hole is in the pits 21 and 25 and in the slip fit space.

The assembly including the broach and the insert are then placed in an oven or furnace to cause the tin-weld or solder to melt and flow about the side walls of the insert and of the hole in such a way that the pits 21 and 25 are secured together by means of the tin-weld against relative movement with respect to one another. After the assembly including the broach and the insert have been removed from the furnace they are allowed to cool so that the solder will rigidify and form an excellent bond between the insert and the side walls of the hole. New teeth 24a (FIGURE 5) are then formed in the insert 24 in a conventional manner.

Tests have shown that inserts which have been secured to a broach, in the manner described above, are capable of withstanding the blows of a five pound sledge hammer without damaging the bond between the insert and the side walls defining the hole and that they are thus capable of withstanding the loads to which they are to be subjected during operation of the broach. It has further been found that where an insert installed according to the present method has been subjected to a static load of thirty-five hundred pounds, the bond has held up and no relative movement has occurred between the insert and the side walls of the hole. After the insert has been secured to the side walls of the hole, new teeth are ground into the insert in such a way that they will be properly related with respect to the other teeth on the cutter.

In the event the insert or its teeth break or become damaged the insert may be reheated so as to melt the solder to enable the insert to be readily removed from the broach so that a new insert may be assembled therewith in the same manner discussed above.

It will be understood that modifications and variations may be effected without departing from the scope of the novel concepts of the present invention.

I claim as my invention:

1. In a method of replacing damaged teeth on a broach, the steps of electrical discharge machining a hole in the broach at the area of the damaged teeth to remove the damaged teeth from the broach with the hole being defined by pitted side walls, grinding the pitted side walls of the hole to remove rough edges created by the electrical discharge machining of the hole but leaving the pits in the side walls, forming an insert having insert walls provided with pits and with the insert being sized to enable it to be slip fitted within the hole, placing solder within the hole, securing the insert under load in the hole, heating the broach to a temperature sufficient to cause the solder to flow into the pits, cooling the broach whereby the solder in the pits locks and secures the insert to the broach, and forming broach teeth in an outer area of the insert.

2. In a method of replacing damaged teeth on a broach, the steps of electrical discharge machining a hole in the broach by use of an undercut electrode at the area of the damaged teeth to remove the teeth from the broach with the hole being defined by pitted parallel side walls, grinding the pitted side walls of the hole to remove rough edges created by the electrical discharge machining of the hole but leaving the pits in the side walls, forming an insert having insert walls provided with pits and with the insert being sized to enable it to be slip fitted within the hole, placing solder within the hole, placing the insert in the hole, heating the broach to a temperature sufficient to cause the solder to flow in the broach hole side walls and the insert side walls, cooling the broach whereby the solder in the pits locks and secures the insert to the broach, and forming broach teeth in an outer area of the insert.

3. In a method of replacing a radial segment of a metal article, the steps of electrical discharge machining a radial hole into the article with its side walls being formed with pits therein, grinding the side walls to smooth any sharp edges about the pits to enable an insert to be slip fitted with the hole, forming an insert having side walls with pits, the side walls being sized for slip fitted engagement within the hole, placing solder in the hole and then placing the insert in the hole under spring load, and heating the solder to a temperature sufficient to cause the solder to flow under the spring load into the pits to secure the insert against movement and in assembly with the side walls of the hole upon cooling of the article.

4. In a method of replacing teeth on a broach, cutting out the damaged teeth by an EDM process leaving side walls defining a radial hole in the broach and with the side walls of the hole having outer edges joined with land surfaces between the teeth, forming an insert with side walls possessing an EDM finish within the hole under load, placing solder within the hole, slip fitting the insert within the hole, heating the solder causing the solder to flow into the pits in the side walls of the hole and the insert with solder in the pits locking the insert with the side walls of the hole upon cooling of the solder and forming broach teeth on the insert.

5. In a method of replacing a radial segment of a metal article, the steps of electrical discharge machining a radial hole into the article with the hole side walls being formed with pits therein, grinding the side walls to smooth any sharp edges about the pits to enable an insert to be slip fitted with the hole, forming an insert having side walls with pits for slip fitted engagement within the hole, placing solder in the hole and then placing the insert in the hole under spring load, and heating the article to a temperature sufficient to cause the solder to flow into the pits to secure the insert against movement and in assembly with the side walls of the hole upon cooling of the article.

6. A repaired broach having cutting teeth thereon including a hole defined by side walls possessing an EDM finish characterized by having myriads of pits therein, an insert slip fitted in said hole and also having an EDM finish characterized by having myriads of pits therein, and solder in said hole and in said pits locking said insert in assembly with the side walls defining said hole preventing relative movement when said insert and said broach are placed under load.

7. A repaired broach having cutting teeth thereon including a hole defined by side walls possessing an EDM finish characterized by having myriads of pits therein, an insert slip fitted in said hole and also having a finish characterized by having myriads of pits therein, and solder in said hole and in said pits locking said insert in assembly with the side walls defining said hole preventing relative movement when said insert and said broach are placed under load, the insert and the hole having confronting wall faces in soldered assembly together.

8. A repaired broach having cutting teeth thereon including a hole defined by said walls possessing an EDM finish characterized by having myriads of pits therein, an insert slip fitted in said hole and also having an EDM finish characterized by having myriads of pits therein, and solder in said hole and in said pits locking said insert in assembly with the side walls defining said hole preventing relative movement when said insert and said broach are placed under load, the side walls and the insert having upper edges disposed in land areas disposed between the teeth.

9. In a method of replacing a damaged tooth bearing insert soldered to a broach, the steps of heating the solder enabling the insert to be disengaged from a hole in the broach, forming a new insert having insert walls provided with pits and with the insert being sized to enable it to be slip fitted within the hole, placing solder within the hole, securing the insert under load in the hole, heating the broach to a temperature sufficient to cause the solder to flow into the insert and broach pits, cooling the broach whereby the solder in the pits locks and secures the insert to the broach, and forming broach teeth in an outer area of the insert.

10. In a method of replacing a radial segment of a metal article, the steps of electrical discharge machining a radial hole into the article with its side walls being formed with pits therein and with upper edges of the side walls being formed in land areas disposed between the teeth, grinding the side walls to smooth any sharp edges about the pits to enable an insert to be slip fitted with the hole, forming an insert having side walls with pits, the side walls being sized for slip fitted engagement within the hole, placing solder in the hole and then placing the insert in the hole under spring load, and heating the solder to a temperature sufficient to cause the solder to flow under the spring load into the pits to secure the insert against movement and in assembly with the side walls of the hole upon cooling of the article.

11. In a method of replacing teeth on a broach by the use of an electrode having a headed end of not more than ¼", and which is sized for cutting out damaged broach teeth, the steps of placing the headed end of the electrode against the damaged teeth and removing them by an EDM process forming a radial hole having parallel non-tapered side walls, placing solder within the hole, slip fitting an insert having side walls finished by an EDM process within the hole under load, heating the solder causing the solder to flow into the pits in the side walls of the hole and the insert with solder in the pits locking the insert with the side walls of the hole upon cooling of the solder.

12. A repaired broach having an insert soldered in assembly in a hole in the broach, the insert and the hole being defined by EDM pitted side wall surfaces with solder therein locking the insert in assembly with the broach.

References Cited by the Examiner

UNITED STATES PATENTS

| | | | |
|---|---|---|---|
| 602,293 | 4/1898 | Ahearn | 76—112 |
| 729,154 | 5/1903 | Gausden | 76—112 |
| 1,403,011 | 1/1922 | Cogsdill | 76—101 |
| 1,663,367 | 3/1928 | Brown | 76—101 |
| 1,837,344 | 12/1931 | Stauder | 76—112 |
| 1,945,535 | 2/1934 | Shiltz | 29—95.1 |
| 2,242,036 | 5/1941 | Lapointe | 29—95.1 |
| 2,427,588 | 9/1947 | Burnett | 219—69 |
| 2,526,423 | 10/1950 | Rudorff | 219—15 |
| 2,614,813 | 10/1952 | Shepherd. | |
| 2,714,317 | 8/1955 | Drake | 76—112 |
| 2,813,966 | 11/1957 | Matulaitis | 219—69 |
| 2,909,641 | 10/1959 | Kucyn | 219—69 |
| 2,973,047 | 2/1961 | Edgar et al. | 76—108 |

GRANVILLE Y. CUSTER, JR., *Primary Examiner.*

WILLIAM W. DYER, JR., FRANK E. BAILEY,
*Examiners.*